(12) United States Patent
Brossman et al.

(10) Patent No.: US 8,902,459 B2
(45) Date of Patent: Dec. 2, 2014

(54) MULTIPLE PASS PIPE/FILTER DATE STREAM PROCESSING MECHANISM

(71) Applicant: Ricoh Company Ltd., Tokyo (JP)

(72) Inventors: Craig D. Brossman, Durango, CO (US);
Michael E. Haller, Niwot, CO (US);
Bryan D. Keil, Boulder, CO (US);
Michael G. Lotz, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 130 days.

(21) Appl. No.: 13/714,842

(22) Filed: Dec. 14, 2012

(65) Prior Publication Data

US 2014/0168691 A1    Jun. 19, 2014

(51) Int. Cl.
*G06F 3/12* (2006.01)

(52) U.S. Cl.
CPC ........................................ *G06F 3/12* (2013.01)
USPC ....................................................... 358/1.15

(58) Field of Classification Search
CPC ........................................................ G06F 3/12
USPC ........................................................ 358/1.15
See application file for complete search history.

(56) References Cited

U.S. PATENT DOCUMENTS

| | | | |
|---|---|---|---|
| 6,259,460 B1 | 7/2001 | Gossett et al. | |
| 6,690,381 B1 | 2/2004 | Hussain et al. | |
| 7,237,043 B2 | 6/2007 | Solomon et al. | |
| 7,657,726 B2 | 2/2010 | Emma et al. | |
| 2006/0126105 A1* | 6/2006 | Sedky et al. | 358/1.15 |

OTHER PUBLICATIONS

Barnes, et al., "Flea-flicker" Multipass Pipelining: An Alternative to the High-Power Out-of Order Offense, (2005), 12 pages.
Biddiscombe, et al., "Time Dependent Processing in a Parallel Pipeline Architecture", Retrieved from http://ieeexplore.ieee.org/xpl/login.jsp?tp=&arnumber=4376164&url=http%3A%2F%2Fieeexplore.ieee.org%2Fxpls%2Fabs_all.jsp%3Farnumber%3D4376164, (2007), 1376-1383.
Parhi, K., , "Pipeline Interleaving and Parallelism in Recursive Digital Filters—Part I: Pieplining Using Scattered Look-Ahead and Decomposition", *IEEE 0096-3518/89/0700-1099*, (1989), 1099-1117.
Shanbhag, et al., "A Pipelined Adaptive Lattice Filter Architecture", *IEEE Transactions on Signal Processing*, 41(5), (1993), 1925-1939.
Zagacki, et al., "Architecture of a 3D Software Stack for Peak Pentium III Processor Performance", *Intel Technology Journal Q2*, Retrieved from http://noggin.intel.com/content/architecture-of-a-3d-software-stack-for-peak-pentium%C2%AE-iii-processor-performance, (1999), 1-11.

* cited by examiner

*Primary Examiner* — Qian Yang
(74) *Attorney, Agent, or Firm* — Blakely, Sokoloff, Taylor & Zafman LLP

(57) ABSTRACT

A computer generated method disclosed. The method includes each filter within a chain of filters of a pipes and filters architectural pattern declaring a pass requirement to indicate a number of times the filter is to be processed to produce final form data and processing a stream of data at each filter within the chain of filters to produce the final form data.

16 Claims, 4 Drawing Sheets

US 8,902,459 B2

MULTIPLE PASS PIPE/FILTER DATE STREAM PROCESSING MECHANISM

FIELD OF THE INVENTION

The invention relates to the field of computer systems. Particularly, the invention relates to pipes and filters architecture pattern.

BACKGROUND

Printers are common peripheral devices attached to computers. A printer allows a computer user to make a hard copy of documents that are created in a variety of applications and programs on a computer. To function properly, a channel of communication is established (e.g., via a network connection) between the printer and the computer to enable the printer to receive commands and information from the host computer.

Once a connection is established between a workstation and the printer, printing software is implemented at a print server to manage a print job from order entry and management through the complete printing process. The printing software may implement a pipes and filters architectural pattern (pipes/filters pattern) to process print job data streams. A pipes/filters pattern provides a structure for systems that process a stream of data, where each processing step is encapsulated in a filter component. Data is passed through pipes between adjacent filters.

A pipe/filter pattern is sequential in behavior, with each filter receiving an output of a previous filter as its input. Thus, pipes/filters patterns provide the benefit of breaking tasks into smaller units, resulting in increased flexibility and maintainability. A problem with the pipes/filters patterns is that it does not lend itself to solving problems that require look ahead capability. For instance, an individual filter is required to buffer sufficient information until it has that information prior to sending the buffered contents downstream.

Accordingly, a mechanism to solve pipeline look ahead problems without requiring a filter to buffer data large amounts of data is desired.

SUMMARY

In one embodiment a computer generated method is disclosed. The method includes each filter within a chain of filters of a pipes and filters architectural pattern declaring a pass requirement to indicate a number of times the filter is to be processed to produce final form data and processing a stream of data at each filter within the chain of filters to produce the final form data In another embodiment, a print server is disclosed. The print server includes a printing software product that includes a pipes and filters architectural pattern having chain of filters, wherein each filter within a chain of filters of a pipes and filters architectural pattern declares a pass requirement to indicate a number of times the filter is to be processed to produce final form data and processes a stream of data to produce the final form data.

BRIEF DESCRIPTION OF THE DRAWINGS

A better understanding of the present invention can be obtained from the following detailed description in conjunction with the following drawings, in which.

DETAILED DESCRIPTION

A multiple pass pipe/filter design pattern mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
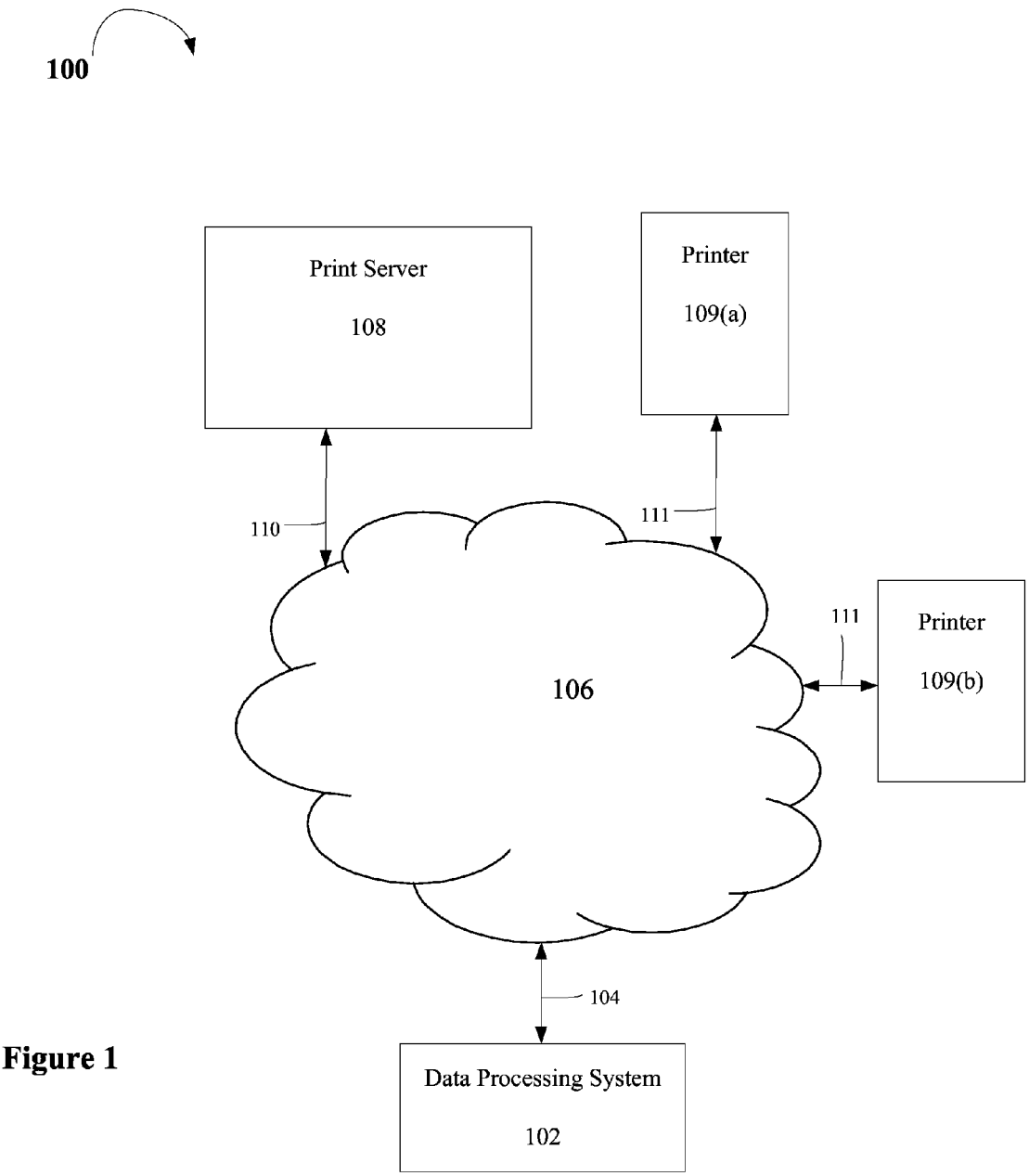
FIG. 1 illustrates one embodiment of a data processing system network.

FIG. 1 illustrates one embodiment of a data processing system network 100. Network 100 includes a data processing system 102, which may be either a desktop or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art. In one embodiment, data processing system 102 includes and employs the Windows operating system, or other operating system, and/or network drivers permitting data processing system 102 to communicate with network 106 for the purposes of employing resources within network 106.

Network 106 may be a local area network (LAN) or any other network over which print requests may be submitted to a remote printer or print server. Communications link 104 may be in the form of a network adapter, docking station, or the like, and supports communications between data processing system 102 and network 106 employing a network communications protocol such as Ethernet, the AS/400 Network, or the like.

According to one embodiment, network 106 includes a print server 108 that serves print requests over network 106 received via communications link 110 between print server 108 and network 106. Print server 108 subsequently transmits the print requests via communications link 110 to one of printers 109 for printing, which are coupled to network 106 via communications links 111.

In one embodiment, a print application at data processing system 102 allows a user to select the desired print server 108 and submit requests for service requests to printer 109 via print server 108 over network 106. In a further embodiment, the print application implements the (Advanced Function Presentation) AFP™ presentation system developed by International Business Machines Corporation to represent documents in a data format that is independent of the methods that are utilized to capture or create those documents.

According to the AFP system, documents may include combinations of text, image, graphics, and/or barcode objects in device and resolution independent formats. Documents may also include and/or reference fonts, overlays, and other resource objects, which are required at presentation time to present the data properly. An AFP system also implements Structured Field commands (or Structured Fields). A Structured Field is an instruction (or collection of instructions) to an AFP print driver. Each Structured Field command is an individual data record that has a specific format and each unique Structured Field command has a unique function that it performs.

In other embodiments, additional/alternative presentation architectures may be implemented at the print application. However in an AFP embodiment, the print application provides a Mixed Object Document Content Architecture (MO:DCA) data stream to print server 108. In such an embodiment, the AFP MO:DCA data streams are object-oriented streams including, among other things, data objects, page objects, and resource objects. In a further embodiment, AFP MO:DCA data streams include a Resource Environment Group (REG) that is specified at the beginning of the AFP document, before the first page. When the AFP MO:DCA data streams are processed by print server 108, the REG structure is encountered first and causes server 108 to download any of the identified resources that are not already present in the printer.

Although described as separate entities, other embodiments may include print server 108 being incorporated in one or more of the printers 109. In yet further embodiments, the print server and printer may be physically separate entities. Therefore, the data processing system network depicted in FIG. 1 is selected for the purposes of explaining and illustrating the present invention and is not intended to imply architectural limitations. Those skilled in the art will recognize that various additional components may be utilized in conjunction with the present invention.

According to one embodiment, print server 108 implements a printing software product that manages the printing of documents from data processing system 102 and one or more of printers 109. In other embodiments, the printing software product manages printing of documents from multiple data processing systems 102 to the one or more printers 109. In one embodiment, the printing software product may be implemented using either InfoPrint Manager (IPM) or InfoPrint ProcessDirector (IPPD), although other types of printing software may be used instead. In a further embodiment, the print application at data processing system 102 interacts with the printing software product to provide for efficient transmission of print jobs.

Figure 2:
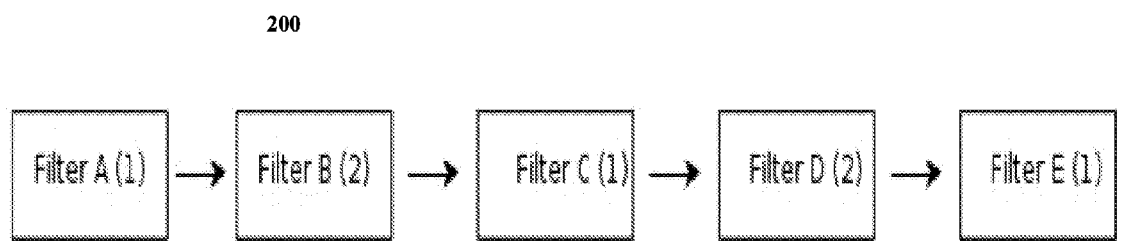
FIG. 2 illustrates one embodiment of a pipe/filter pattern.

According to one embodiment, the printing software product implements a pipe/filter design pattern to process AFP structured fields. In such an embodiment, the printing software product includes a chain of filters that perform look ahead processing. FIG. 2 illustrates one embodiment of a filter chain 200 including filters A-E.

According to one embodiment, each filter declares its pass requirement prior to processing in order to indicate the number of times the filter is to be processed to produce its final form data. Thus, the filter is assured that it will receive the same data on each pass, while gathering and subsequently utilizing the look ahead information.

As shown in FIG. 2, filters B and D in filter chain 200 require two passes, while filters A, C and E each require one. In such an embodiment, filter B may be implemented to remove unused resources from the print data stream, while filter D counts the number of pages in the stream and adds a structured field, and filter E writes the final stream to a disk.

Figure 3:
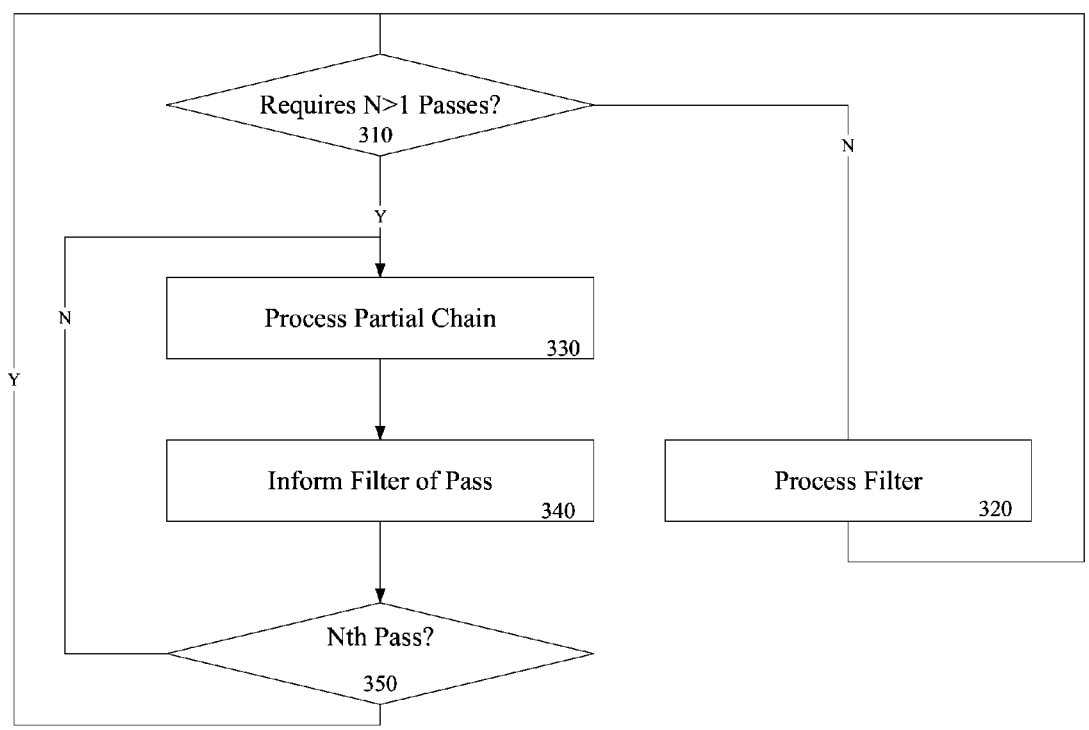
FIG. 3 is a flow diagram illustrating one embodiment for processing a filter.

FIG. 3 is a flow diagram illustrating one embodiment for processing a filter. At decision block 310, it is determined whether a filter requires N passes (where N>1) on the data. If the filter requires less the N passes, the filter is a single pass filter that is processed, processing block 320. Subsequently, control is retuned to decision block 310, where it is determined whether the next filter requires N passes.

If the filter requires N passes, a partial chain up to and including the current filter process the data, processing block 330. At processing block 340, the filter is informed of the current pass number on which the first filter is operating. At decision block 350, it is determined whether the current filter has run for Nth time. If so, the chain is extended to the next filter, with control being returned to decision block 310. Otherwise, control is returned to processing block 330, where partial chain is again processed. Accordingly, the chain is extended to the next multi-pass filter where the process is repeated. When the complete pipeline is run and the final filter in the chain is run its required number of passes, the chain is complete.

Reviewing the process within the context of FIG. 2, filter chain 200 is run in three segments, A-B, A-D, and A-E. The first segment is run twice because filter B requires two passes. For each run, the filters are given the pass number, 1 then 2. When the second pass of segment 1 is complete, Filter B is guaranteed to produce final form data and the next segment is processed. The first segment is run twice, because filter B requires 2 passes.

The second segment is run similarly, where Filters C and D are given their pass numbers. Note that the first segment is run again as part of the second segment. However, those filter's pass numbers remain unchanged. The complete final segment is run when each multi-pass filter is run a minimum of its number of required passes. This ensures that each filter passes final form data to the next, while minimizing the number of times each filter is run. Filter E runs only once in this design, thus minimizing I/O.

Figure 4:
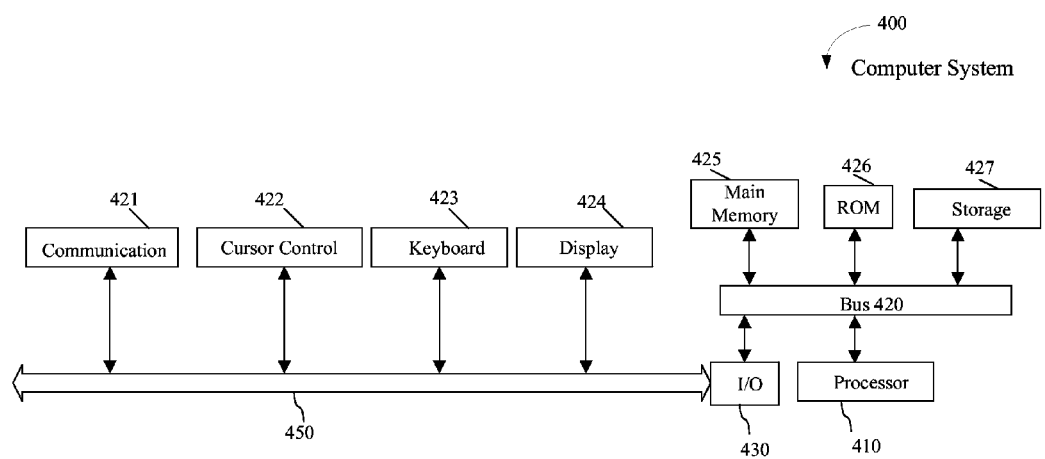
FIG. 4 illustrates one embodiment of a computer system.

FIG. 4 illustrates a computer system 400 on which data processing system 102 and/or server 108 may be implemented. Computer system 400 includes a system bus 420 for communicating information, and a processor 410 coupled to bus 420 for processing information.

Computer system 400 further comprises a random access memory (RAM) or other dynamic storage device 425 (referred to herein as main memory), coupled to bus 420 for storing information and instructions to be executed by processor 410. Main memory 425 also may be used for storing temporary variables or other intermediate information during execution of instructions by processor 410. Computer system 400 also may include a read only memory (ROM) and or other static storage device 426 coupled to bus 420 for storing static information and instructions used by processor 410.

A data storage device 425 such as a magnetic disk or optical disc and its corresponding drive may also be coupled to computer system 400 for storing information and instructions. Computer system 400 can also be coupled to a second I/O bus 450 via an I/O interface 430. A plurality of I/O devices may be coupled to I/O bus 450, including a display device 424, an input device (e.g., an alphanumeric input device 423 and or a cursor control device 422). The communication device 421 is for accessing other computers (servers or clients). The communication device 421 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. An article of manufacture comprising a non-transitory machine-readable medium including data that, when accessed by a machine, cause the machine to perform operations comprising:
   each filter within a chain of filters of a pipes and filters architectural pattern declaring a pass requirement to indicate a number of times the filter is to be processed to produce final form data; and
   processing a stream of data at each filter within the chain of filters to produce the final form data, by:
      determining whether a first filter requires two or more passes to process the stream of data;
      determining whether the first filter has run for the declared number of passes; and
      determining whether a second filter requires two or more passes to process the stream of data if the first filter has run for the declared number of passes.

2. The article of manufacture of claim 1 wherein processing the stream of data further comprises:
   processing the stream of data at a first subcomponent of the chain of filters; and
   informing the first filter of a current pass number on which the first filter is operating.

3. The article of manufacture of claim 2 wherein the first subcomponent comprises a partial chain of the filters up to and including the first filter.

4. The article of manufacture of claim 2 wherein processing the stream of data comprises:
   reprocessing the stream of data at the first subcomponent if the first filter has not run for the declared number of passes.

5. The article of manufacture of claim 1 wherein processing the stream of data further comprises:
   processing the stream of data at a second subcomponent of the chain of filters; and
   informing the second filter of a current pass number on which the second filter is operating.

6. The article of manufacture of claim 5 wherein the second subcomponent comprises a partial chain of the filters up to and including the second filter.

7. The article of manufacture of claim 1 wherein the stream of data is an Advanced Function Presentation (AFP) data stream.

8. The article of manufacture of claim 7 wherein the chain of filters process structured fields within the AFP data stream.

9. A print server comprising:
   a non-transitory storage device to store a printing software product that includes a pipes and filters architectural pattern having chain of filters, wherein each filter within a chain of filters of a pipes and filters architectural pattern: and
   a processor to execute the printing software product to:
      declare a pass requirement to indicate a number of times the filter is to be processed to produce final form data; and
      process a stream of data to produce the final form data, by:
         determining whether a first filter requires two or more passes to process the stream of data,
         determining whether the first filter has run for the declared number of passes and
         determining whether a second filter requires two or more passes to process the stream of data if the first filter has run for the declared number of passes.

10. The print server of claim 9 wherein the printing software product processes the stream of data by processing the stream of data at a first subcomponent of the chain of filters and informing the first filter of a current pass number on which the first filter is operating.

11. The print server of claim 10 wherein the first subcomponent comprises a partial chain of the filters up to and including the first filter.

12. The print server of claim 10 wherein the printing software product processes the stream of data by reprocessing the stream of data at the first subcomponent if the first filter has not run for the declared number of passes.

13. The print server of claim 9 wherein the printing software product processes the stream of data by processing the stream of data at a second subcomponent of the chain of filters and informing the second filter of a current pass number on which the second filter is operating.

14. The print server of claim 13 wherein the second subcomponent comprises a partial chain of the filters up to and including the second filter.

15. The print server of claim 9 wherein the stream of data is an Advanced Function Presentation (AFP) data stream.

16. The print server of claim 15 wherein the chain of filters process structured fields within the AFP data stream.

* * * * *